(12) United States Patent
Kim

(10) Patent No.: US 9,016,482 B2
(45) Date of Patent: Apr. 28, 2015

(54) SHELF FOR DISPLAY OF GOODS

(71) Applicant: Seidae Industrial Co., Ltd., Goyang-si (KR)

(72) Inventor: Deok-Rae Kim, Goyang-si (KR)

(73) Assignee: Seidae Industrial Co., Ltd., Goyang-Si (KR)

( * ) Notice: Subject to any disclaimer, the term of this patent is extended or adjusted under 35 U.S.C. 154(b) by 0 days.

(21) Appl. No.: 14/231,848

(22) Filed: Apr. 1, 2014

(65) Prior Publication Data

US 2014/0299560 A1     Oct. 9, 2014

(30) Foreign Application Priority Data

Apr. 9, 2013    (KR) .................. 10-2013-0038390

(51) Int. Cl.
  A47F 5/08      (2006.01)
  A47F 1/12      (2006.01)
  B65G 1/02      (2006.01)

(52) U.S. Cl.
  CPC ............... *A47F 1/126* (2013.01); *B65G 1/023* (2013.01); *B65G 1/026* (2013.01)

(58) Field of Classification Search
  CPC ......... A47F 1/126; B65G 1/026; B65G 1/023
  USPC ................. 211/151, 184, 59.2, 59.3, 126.15; 312/91, 126, 131, 132, 134; 193/35 R, 193/35 A; 198/860.1
  See application file for complete search history.

(56) References Cited

U.S. PATENT DOCUMENTS

| | | | | |
|---|---|---|---|---|
| 2,781,918 | A * | 2/1957 | Palm, Jr. ................... | 211/128.1 |
| 3,269,557 | A * | 8/1966 | Wahl .............................. | 211/151 |
| 3,900,112 | A * | 8/1975 | Azzi et al. .................... | 211/187 |
| 4,383,614 | A * | 5/1983 | Miller .......................... | 211/59.2 |
| 4,394,910 | A * | 7/1983 | Miller .......................... | 211/59.2 |
| 4,454,948 | A * | 6/1984 | Spamer ........................ | 211/59.2 |
| 5,259,518 | A * | 11/1993 | Sorenson et al. ............ | 211/59.2 |
| 5,279,430 | A * | 1/1994 | Benton ......................... | 211/151 |
| 5,295,591 | A * | 3/1994 | Slater ........................... | 211/59.2 |
| 5,474,412 | A * | 12/1995 | Pfeiffer et al. ................ | 414/276 |
| 5,788,090 | A * | 8/1998 | Kajiwara ...................... | 211/59.2 |
| 6,089,385 | A * | 7/2000 | Nozawa ....................... | 211/59.2 |
| 6,102,185 | A * | 8/2000 | Neuwirth et al. ........... | 193/35 R |
| 6,132,158 | A * | 10/2000 | Pfeiffer et al. ................ | 414/276 |
| 6,311,852 | B1 * | 11/2001 | Ireland ......................... | 211/59.2 |
| 6,409,026 | B2 * | 6/2002 | Watanabe .................... | 211/59.2 |

(Continued)

FOREIGN PATENT DOCUMENTS

| KR | 2002929850000 | 10/2002 |
|---|---|---|
| KR | 2003116120000 | 4/2003 |

(Continued)

*Primary Examiner* — Joshua J Michener
*Assistant Examiner* — Devin Barnett
(74) *Attorney, Agent, or Firm* — Lexyoume IP Meister, PLLC

(57) ABSTRACT

The present invention relates to a shelf for display of goods. More specifically, the present invention relates to a goods-display self in which improved are the structure of unit shelves composed by combining end caps with both ends of fixed frames accommodating roller units and the structure of front and rear support frames combined with both ends of the unit shelves. The said unit shelf not only can provide an easy space control to another unit shelf neighboring along front and rear support frames but also can fix set positions by using a stopper and can be separated conveniently by using a separation device.

3 Claims, 8 Drawing Sheets

(56) References Cited

U.S. PATENT DOCUMENTS

| | | | |
|---|---|---|---|
| 6,431,808 B1 * | 8/2002 | Lowrey et al. | 414/276 |
| 6,497,326 B1 * | 12/2002 | Osawa | 211/59.2 |
| 6,641,352 B2 * | 11/2003 | Pfeiffer | 414/276 |
| RE38,517 E * | 5/2004 | Pfeiffer et al. | 414/276 |
| 7,497,342 B2 * | 3/2009 | Hardy | 211/59.3 |
| 7,628,282 B2 * | 12/2009 | Hardy | 211/59.3 |
| 7,815,060 B2 * | 10/2010 | Iellimo | 211/151 |
| 8,016,139 B2 * | 9/2011 | Hanners et al. | 211/184 |
| D674,219 S * | 1/2013 | Kim | D6/702 |
| D674,221 S * | 1/2013 | Kim | D6/702 |
| 8,573,379 B2 * | 11/2013 | Brugmann | 193/37 |
| D699,059 S * | 2/2014 | Kim | D6/702 |
| D702,067 S * | 4/2014 | Kim | D6/702 |
| D705,585 S * | 5/2014 | Kim | D6/705.7 |
| D706,562 S * | 6/2014 | Kim | D6/705.7 |
| 2002/0092726 A1 * | 7/2002 | Kiviranta et al. | 193/37 |
| 2003/0209401 A1 * | 11/2003 | Shaw et al. | 193/35 R |
| 2004/0001785 A1 * | 1/2004 | Sullivan | 422/300 |
| 2004/0178156 A1 * | 9/2004 | Knorring et al. | 211/59.2 |
| 2005/0150847 A1 * | 7/2005 | Hawkinson | 211/59.2 |
| 2010/0072152 A1 * | 3/2010 | Kim | 211/151 |
| 2010/0133219 A1 * | 6/2010 | Sun | 211/151 |
| 2012/0217212 A1 * | 8/2012 | Czalkiewicz et al. | 211/59.2 |
| 2012/0255922 A1 * | 10/2012 | Bryson et al. | 211/59.3 |
| 2013/0037498 A1 * | 2/2013 | Kao | 211/59.2 |
| 2013/0075352 A1 * | 3/2013 | Mitten et al. | 211/59.2 |
| 2013/0213916 A1 * | 8/2013 | Leahy et al. | 211/151 |
| 2014/0299560 A1 * | 10/2014 | Kim | 211/59.2 |
| 2014/0305894 A1 * | 10/2014 | Thompson | 211/162 |

FOREIGN PATENT DOCUMENTS

| | | |
|---|---|---|
| KR | 2003272370000 | 9/2003 |
| KR | 1008289660000 | 5/2008 |
| KR | 1020120094295 | 8/2012 |

* cited by examiner (A)

(B)

US 9,016,482 B2

SHELF FOR DISPLAY OF GOODS

TECHNICAL FIELD

The present invention relates to a shelf for display of goods. More specifically, the present invention relates to a goods-display self in which improved are the structure of unit shelves composed by combining end caps with both ends of fixed frames accommodating roller units and the structure of front and rear support frames combined with both ends of the unit shelves. The said unit shelf not only can provide an easy space control to another unit shelf neighboring along front and rear support frames but also can fix set positions by using a stopper and can be separated conveniently by using a separation device.

BACKGROUND TECHNOLOGY OF INVENTION

In general, the goods-display self of such places as convenience stores is installed to always display goods at the very front so that customers may identify and select them easily. In case a customer takes out a piece of goods from the very front of the shelf installed as described above, the next piece of goods in the order of display again slides down to the very front by the slope inclined with a certain degree. On the shelf surface in contact with the bottom of goods, multiple rollers are installed. These rollers not only makes the empty space created by the first-out goods filled with the next ones rolling down but also has a dividing guide member installed in the row section of goods so that goods may be displayed in a row.

For example, "Showcase Shelf" of Korean Registered Patent publication No. 1020120094295 can easily connect the roller units with multiple rollers in the direction of length or width. Thus, it not only is unlimited by the change of installation spaces but also enables the direct assembling and use of injection-molded products without separate processing, which may improve the productivity through minimization of processes. The prior art is equipped with the roller units with multiple rollers and the wing part with fixing pins on the outside bottom of end caps combined with the roller units. The said wing part prepared at each of the roller units and end caps is placed on the inserting part with a fixing groove prepared on the inner bottom of other roller units and end caps located next to the previous ones.

At this time, each said fixing pin and each said fixing groove are combined to prevent each other from breaking away. And the vertical wall, which keeps goods in a line, is fixed and installed by inserting both ends into the fixing piece formed at the top of end caps installed at both ends of roller units.

The said conventional showcase shelf is continuously assembled by using the method of inserting the fixing pin formed at each bottom wing part of the roller units and end caps into the fixing groove at each bottom wing part of other neighboring roller units and end caps. Due to the characteristics of such a structure, in case a roller unit is separated from another neighboring roller unit, it is impossible to assemble them again. In this case, reassembling requires one more roller unit, which causes an increase in the unit cost. Since the space for each size of goods is controlled by connecting separate simple guide members, the conventional showcase shelf has a problem that the slope of the shelf should be increased for a smooth movement of goods with a large contact area. In addition, since the said showcase shelf is a structure to be assembled by connecting a roller unit and another neighboring roller unit face-to-face in the direction of length and width, they may be separated from each other in case a large load is created after the combination. Thus, in order to prevent this problem, a net type of support frame, separately fabricated, is required, which causes a unit cost increase.

In addition, the "showcase shelf" of Korean Registered Patent Registration No. 1008289660000 registered by the applicant(s) of the present invention can connect a single or multiple roller units containing multiple rollers by separating the conventional structure of an integrated casing into a fixed frame and a connecting frame. This shelf not only saves the manufacturing cost of molds and the cost of materials but also improves the productivity through minimization of processing and assembling processes and makes goods slide even more smoothly. The said prior art consists of a roller unit equipped with multiple rollers inserted at the top, a pair of fixed frames surrounding the roller unit along both length-direction sides of the roller unit, and end caps screw-connected with both ends of the fixed frames.

The said conventional showcase shelf has a structure of aligning the screw holes formed on both sides of end caps to the screw connecting holes drilled at both ends of fixed frames and then connecting them with a connecting screw. Thus, the number of screw hole drilling processes and the number of screw assembling processes for the said fixed frames and end caps increases to cause an increase in unit manufacturing cost. Since the end caps should be molded in a variety of sizes to meet the number of combined roller units, the shelf ha a problem of creating too much cost in mold manufacturing. In addition, since the said showcase shelf has a structure of arranging face-to-face fixed frames continuously and the space control due to the size of goods is possible only by selective combination of guide members, which play a role as a simple divider, the said shelf again has a problem that due to the large contact area, the slope should be increased for a smooth movement of goods.

And a showcase shelf composed of roller units, end caps, guide members, and support members as shown above, is proposed in Registered Utility Model Publications No. 20-02929850000, No. 20-03116120000, and No. 20-03272370000, which were registered by the applicant(s) of the present invention. Since the said showcase shelf also has a structure of mutual assembling and connection, the combined structure is complicated, requires connecting screws for combination and has a large number of assembling processes and parts, which causes an increase in manufacturing cost. Since the structure controls the space for each size of goods by the movement of guide members mostly formed separately. it has a problem that the durability decreases.

CONTENTS OF INVENTION

Task to be Solved

Thus, in order to solve the conventional problems described above in detail, the present invention aims at constructing No.1, No.2, and No.3 unit shelves with a simple structure by firmly combining the hook piece, which is formed at No.1 and No.2 end caps inserted at both ends of L-, T-, and -type fixed frames, with the hook hole, which is formed at the fixed frames accommodating the roller units. This can improve the productivity through minimization of processing and assembling processes. And the process of assembling is simple since the hook bump formed at No.1 and No.2 end caps of the said No.1, No.2, and No.3 unit shelves and the rail formed at the front and rear fixed frames are inserted into each other for combination and fixing. In addition, since it is possible to arrange each unit shelf in an appropriate form according to the size and contact area of displayed goods and control the space between goods, not only minimized is the number of required parts, which saves the unit cost, but also the space is effectively secured due to the minimized number of parts, which provides more smooth cooling air circulation and enhances the display effect of low-temperature goods.

In addition, the objective of the present invention is to provide a goods-display shelf which can add a stopper for a stable fixing at a set position and can conveniently separate, by using a separation device, from the front and rear support frames No.1 and No.2 end caps combined with the tip and terminal of No.1, No.2, and No.3 unit shelves Means for Solution of Task The goods-display shelf for achievement of the above objective is characteristic in that;

in the goods-display shelf composed of such parts as the roller unit (2), which multiple rotating rollers are inserted into, fixed frames, which are combined to prevent the said roller unit (2) with inserted rollers from breaking away, end caps, which are inserted into the tip and terminal of the said fixed frames, and the front and rear support frames (5), which the said end caps are combined by insertion into, and the inserting groove (51) for fixing of the breakaway prevention plate (6) is formed in, the said fixed frames are classified into the -type fixed frame (3c) without the guide plate (31) and the L-type fixed frame (3a)/ T-type fixed frame (3b) which the guide plate (31) is protruded in a body on one side of or at the center of, but the hook holes (32) are formed on the inner bottom of the tip and terminal of the said L-, T-, and -type fixed frames (3a, 3b, 3c);

the said end caps are classified into No.1 end cap (4a), which is inserted the tip and terminal of the L-, and -type fixed frames (3a, 3c) and No.2 end cap (4b), which is inserted the tip and terminal of the T-type fixed frame (3b), but the hook piece (41) is formed at each of the No.1 end cap (4a) and No.2 end cap (4b) so that it may be inserted and hooked to each of the hook holes (32) of the said L-, T-, and -type fixed frames (3a, 3b, 3c);

No.1 unit shelf (1a) and No.2 unit shelf (1b) are composed by inserting /fixing the hook piece (41) of No.1 end cap (4a) into the hook holes of the said L- and -type fixed frames (3a, 3c);

No.2 unit shelf (1b) is composed by inserting /fixing the hook piece (41) of No.2 end cap (4b) into the hook holes of the said T-type fixed frames (3b);

while the hook bumps (42, 42'), which have the inclined surface (421) at front bottom of No.1 end cap (4a) and No.2 end cap (4b) combined with the tip and terminal of the said No.1, No.2, and No.3 unit shelves (1a, 1b, 1c), are protruded face-to-face in multiples on both sides, the inserting groove (43) is formed in the middle; and the "T"-shaped rail (52) is formed at the horizontal part (53) of the said front and rear support frames (5) so that it may be fixed to interlock with the inclined surface (421) after its insertion between the hook bumps (42, 42') formed at the bottom of the said No.1 end cap (4a) and No.2 end cap (4b).

In addition, the goods-display shelf of the present invention is technically characteristic in that included is the stopper (7) made of rubber in contact with the small bumps (54) which are inserted into the inserting groove (43) of No.1 end cap (4a) and No.2 end cap (4b) and whose bottom is protruded at the horizontal part (53) of the front and rear support frames (5). The goods-display shelf of the present invention is also technically characteristic in that the structure has a separation device to separate conveniently and safely No.1 and No.2 end caps combined with the front and rear support frames.

EFFECT OF INVENTION

According to the present invention, it is possible to achieve a firm combination without connecting bolts since the hook piece of No.1 and No.2 end caps is conveniently inserted into the hook hole of the L-, T-, and -type fixed frames accommodating the roller units to construct No.1, No.2, and No.3 unit shelves. Since the hook pump of No.1 and No.2 end caps fixed at No.1, No.2, and No.3 unit shelves is stably inserted into the "T"-shaped rail formed at the front and rear support frames and No.1, No.2, and No.3 unit shelves are mobile, it is possible to control the space and change the position of the unit shelves in accordance with each size of displayed goods. After completion of the position change, it is possible to fix No.1, No., and No.3 unit shelves by using the stopper. Since it is possible to arrange the unit shelves in an appropriate separation distance depending on goods, the contact area between the unit shelves and goods is minimized, sliding of goods gets smooth, and cooling air flows in more smoothly through the empty space between the unit shelves to enhance the display effect of low-temperature goods.

In addition, since the use of a separation device enables a convenient and safe separation of No.1 and No.2 end caps combined with the front and rear support frames, the effect of management is enhanced due to the easy positioning and replacement.

DETAILED CONTENTS FOR IMPLEMENTATION OF INVENTION

Hereunder, in reference to the attached drawings, the desirable Examples of the present invention are described in detail.

Figure 1:
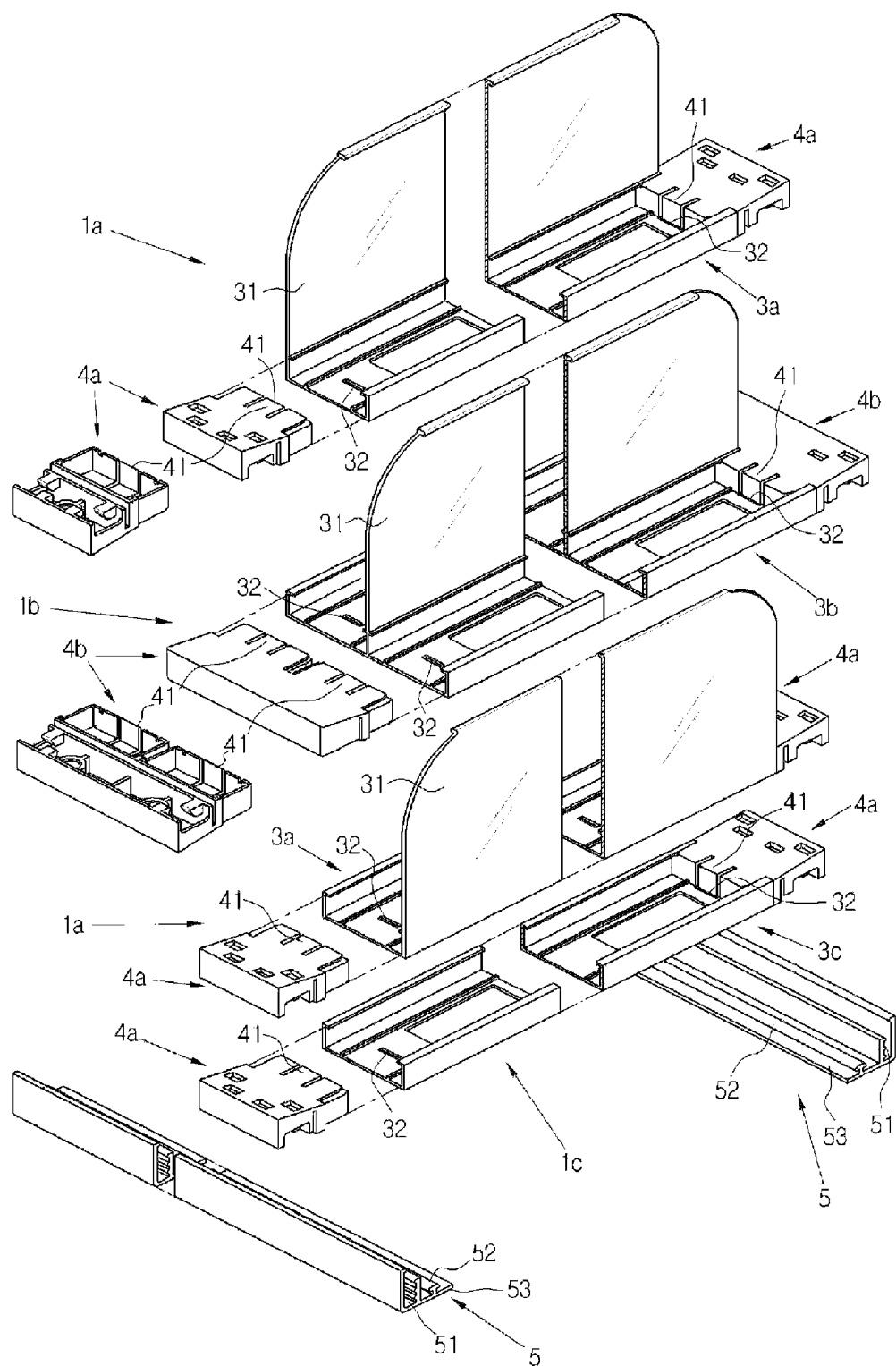
FIG. 1 shows the perspective drawing for the goods-display self of the present invention which is disassembled with some parts omitted.
Figure 7:
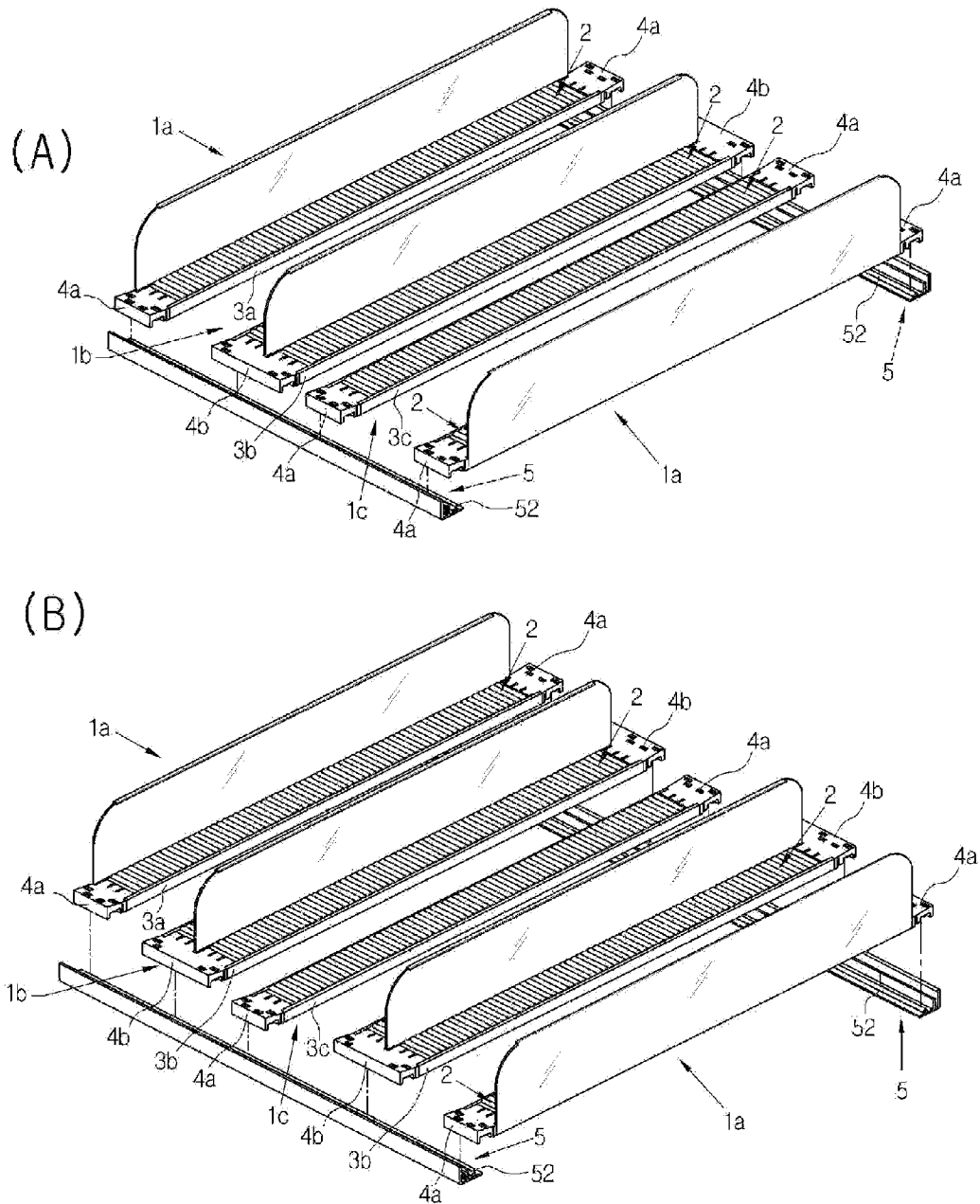
FIG. 7 shows the perspective drawings for 2 Examples in which No.1, No.2, and No.3 unit shelves of the goods-display shelf of the present invention are combined with the front and rear support frames.

FIG. 1 shows the perspective drawing for the goods-display self of the present Example which is disassembled with some parts omitted, and FIG. 7 shows the perspective drawings for Examples in which No.1, No.2, and No.3 unit shelves of the goods-display shelf of the present invention are combined with the front and rear support frames.

As shown by the figures, the self of the present invention consists of the roller unit (2). which combines multiple rollers, L-, T-, and -type fixed frames (3a, 3b, 3c), which are combined to prevent the rollers from breaking away after the roller unit (2) is inserted, and No.1 and No.2 end caps, which are fixed to the tip and terminal of the L-, T-, and -type fixed frames (3a, 3b, 3c). After No.1, No.2, and No.3 unit shelves (1a, 1b, 1c) are separately composed by mutually combining the said roller unit (2), L-, T-, and -type fixed frames (3a, 3b, 3c), and No.1 and No.2 end caps (4a, 4b), they are inserted and combined into each appropriate position of the front and rear support frames (5) placed in the front and rear so that, as shown in FIG. 4, displayed goods may move to the front and contact the breakaway prevention plate (6) fixed into the insertion groove (51) of the support frames (5).

Figure 2:
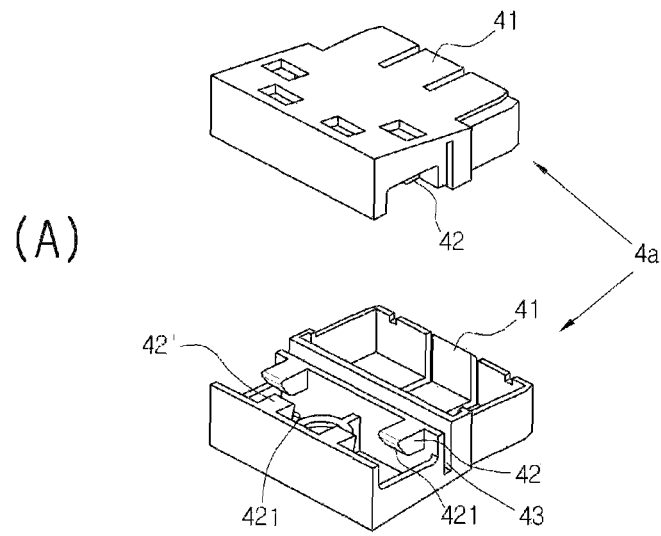
FIG. 2 shows the plane and bottom perspective drawings for the goods-display self of the present invention with No.1 and No.2 end caps expanded.
Figure 2:
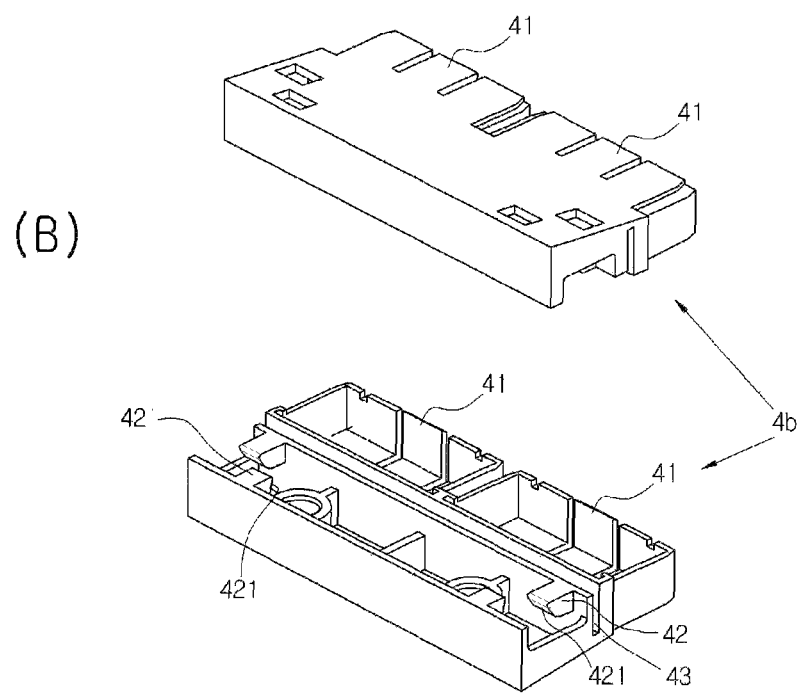
Figure 3:
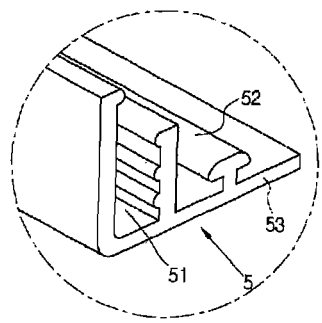
FIG. 3 shows the perspective drawing for the goods-display self of the present invention with some parts of the front and rear support frames expanded.

NO.1 key technology of the present invention is that as shown in FIGS. 1 and 2, the hook holes (32) are formed on the inner bottom for the tip and terminal of the L-, T-, and -type fixed frames (3a, 3b, 3c) and the hook pieces (41) are formed at No.1 end cap (4a) and No.2 end cap (4b) so that they may be inserted into and hook to the hook holes (32) of the said L-, T-, and -type fixed frames (3a, 3b, 3c).

Figure 4:
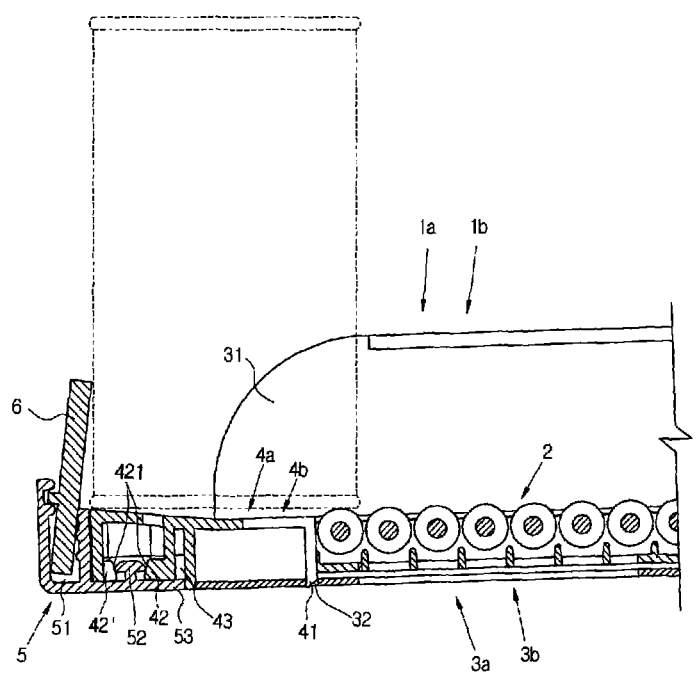
FIG. 4 shows the expanded cross section for some parts of the state at which No.1 end cap of the goods-display shelf of the present invention is combined with the front and rear support frames.

In other words, if the bottom of the hook piece (41) protruded when No.1 end cap (4a) and No,2 end cap (4b) are inserted into the tip and terminal of the L-, T-, and -type fixed frames (3a, 3b, 3c) is bent due to the elastic force in the rear direction, moves in contact with the bottom surface of the L-, T-, and -type fixed frames (3a, 3b, 3c), and arrives at the hook holes (32) drilled on the L-, T-, and -type fixed frames (3a, 3b, 3c), then accomplished is a solid fixed state hooked as shown in FIG. 4 while the original upright state is maintained due to restoration of elastic force.

Here, No.1 end cap (4a) is a common part used in combination with the tip and terminal of the L- and -type fixed frames (3a, 3c) accommodating one roller unit (2), and No.2 end cap (4b) is used in combination with the tip and terminal of the T-type fixed frames (3a) accommodating two roller units (2) side by side.

And the L- and T-type fixed frames (3a, 3b) play a role of preventing the breakaway of goods and dividing goods while increasing the durability, since the guide plates (31) are protruded in one unit on one side or at the center.

Figure 8:
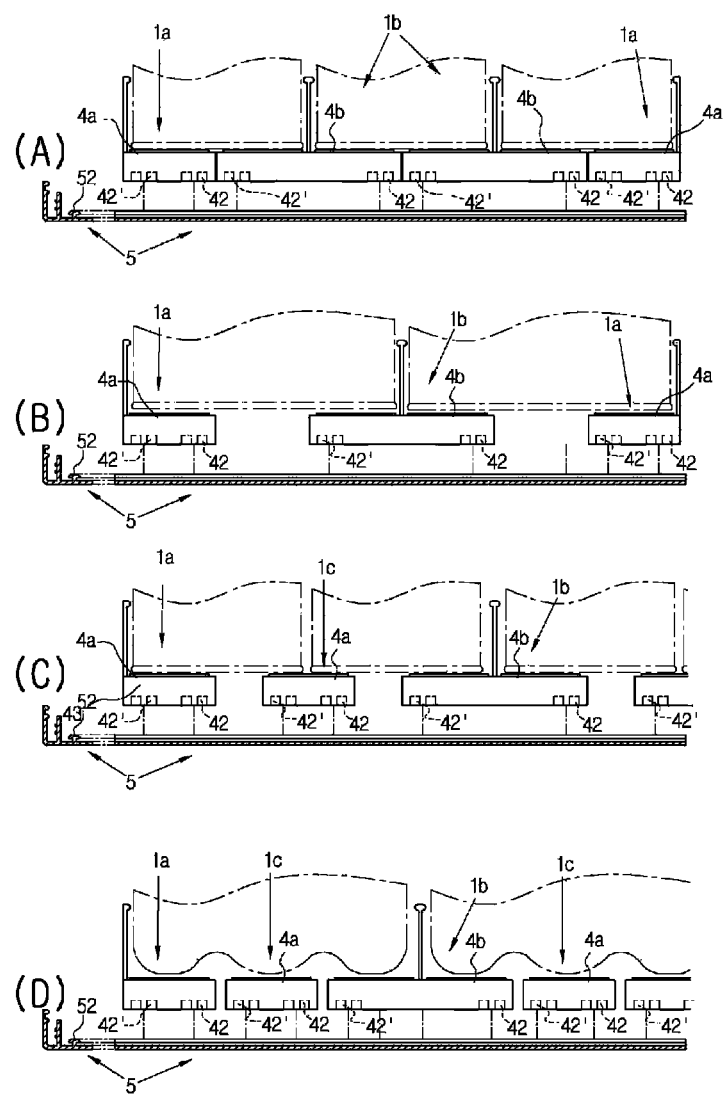
FIG. 8 shows the cross sections for 4 Examples in which No.1, No.2, and No.3 unit shelves of the goods-display shelf of the present invention are combined with the front and rear support frames.

Meanwhile, No. 1 unit shelf (1a) containing the L-type fixed frame (3a) which protrudes the vertical type guide plate (31) on one side is placed on both sides of the showcase shelf as shown in FIG. 7 and FIG. 8(A, B), preventing goods from breaking away, No.2 unit shelf (1b) containing the T-type fixed frame (3b) is placed at the center part of the showcase shelf, as shown in FIG. 7 and FIG. 8(B, D), to play a role of dividing goods on both sides, and No.3 unit shelf (1b) containing the -type fixed frame (3c) without the vertical-type guide plate (31) is placed between No.1 and No.2 unit shelves (1a, 1b) at the center part of the showcase shelf as shown in FIG. 7 and FIG. 8(C, D), to play an auxiliary role of providing a smooth movement of goods and also providing, in case it is used for refrigeration, a smooth movement of cooling air, while minimizing the contact friction force.

Next, No. 2 key technology of the present invention is that while the hook bumps (42, 42'), which have the inclined surface (421) at the bottom front of No.1 end cap (4a) and No.2 end cap (4b) combined with the tip and terminal of No.1, No.2, and No.3 unit shelves (1a, 1b, 1c) as shown in FIGS. 1 through 4, are protruded facing each other on both sides, the insertion groove (43) is formed at the center and the "T"-shaped rail (52) is formed at the horizontal part (53) of the front and rear support frames (5).

Figure 5:
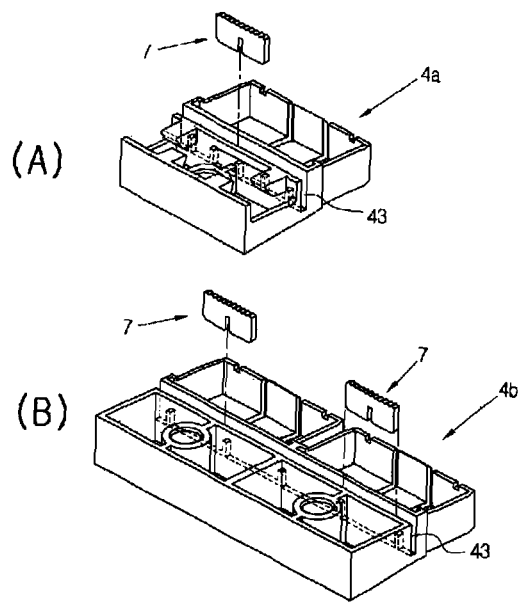
FIG. 5 shows the expanded plane and bottom perspective drawings of the state at which the stopper is combined with No. and No.2 end caps of the goods-display shelf of the present invention.
Figure 6:
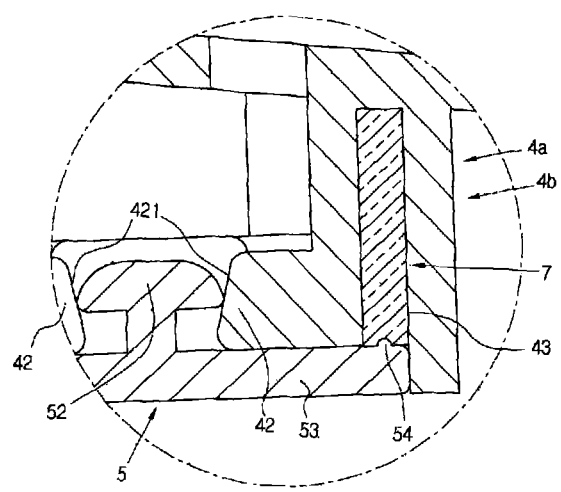
FIG. 6 shows the expanded cross section for some parts of the state at which the stopper is combined with the front and rear support frames after it is inserted into No.1 end cap of the goods-display shelf of the present invention.

In other words, the hook bumps (42, 42') of No.1 end cap (4a) and No.2 end cap (4b) are placed face-to-face at a separated state so that they may be pressurized to widen the gap for push-in at the state of being on one side inserted into or placed on the rail (52) of the front and rear support frames (5) as shown in FIGS. 5 and 6. and after the insertion, they have the inclined surface (421) of forming a diffusion space at the top so that they may be hooked without breakaway. In addition, it is desirable to form the top of the rail (52) of the support frames (5) in an arc form so that they may not be hung when the hook bumps (42, 42') of No.1 end cap (4a) and No.2 end cap (4b) descend in contact with the rail by pressurization.

As mentioned above, if the hook bumps ((42, 42') of No.1 end cap (4a) and No.2 end cap (4b) combined with the tip and terminal of No.1, No.2, and No.3 unit shelves (1a, 1b, 1c) are inserted into the rail (52) of the front and rear support frames (5) as shown in FIGS. 4 and 7, since the inclined surface (421) of the hook bumps (42, 42') of No.1 end cap (4a) and No.2 end cap (4b) is inserted into and wrapped by the rail (52) of the support frames (5), they are combined more stably and it is also possible to control the gap by moving to an appropriate position in both directions.

In other words, since the hook bumps (42, 42') of No.1 end cap (4a) and No.2 end cap (4b) are inserted into the rail (52) of the support frames (%)and can move in both directions, the said No.1, No.2, and No.3 unit shelves (1a, 1b, 1c) may be assembled to provide a variety of separation distances suitable to display of goods as shown in FIG. 8 (A through D).

In addition, as shown in FIGS. 5 and 6, the present invention is inserted into the insertion groove formed at No.1 end cap (4a) and No.2 end cap (4b), and the bottom shelf may be installed by preparing the stopper (7) made of rubber in contact with the small bump (54) protruded/formed at the horizontal part (53) of the front and rear support frames(5). When the weight of both No.1, No.2, and No.3 unit shelves (1a, 1b, 1c) and displayed goods act on the present invention, the bottom of the said stopper (7) contacts with the small bump (54) protruded at the horizontal part (53) of the front and rear support frames (5). Therefore, the present invention maintains a stable fixed state without movement at a set position.

Thus, since in the present invention as mentioned above, each hook piece (41) formed at No.1 end cap (4a) and No.2 end cap (4b) is inserted for stable fixing into each hook hole (32) formed on the inner side at the tip and terminal of the L-, T-, and —-type fixed frames (3a, 3b, 3c), it is possible to conveniently assemble No.1, No.2, and No.3 unit shelves (1a, 1b, 1c), it is possible to use the said No.1, No.2, and No.3 unit shelves (1a, 1b, 1c) after conveniently inserting them into the rail (52) of the support frames (5) by using the hook bumps (42, 42') formed at the combined No.1 end cap (4a) and No.2 end cap (4b), it is also possible to control the space between No.1, No.2, and No.3 unit shelves (1a, 1b, 1c) during the use, and if the stopper (7) with friction force is installed, the present invention is fixed more firmly at a set position by the contact with the small bump (54) protruded at the horizontal part (53) of the support frames (5).

Not only is it possible to assemble the present invention into the array structure of existing showcase shelves, as shown in FIG. 8(A), by using No.1, No.2, and No.3 unit shelves (1*a*, 1*b*, 1*c*), but also it is possible to separate No.1 and No.2 unit shelves (1*a*, 1*b*), as shown in FIG. 8(B), in order to reduce the friction area of goods and provide a smooth circulation of cooling air, it is possible to add No.3 unit shelf (1*c*) and separate the unit shelves, as shown in FIG. 8(C), in order to display the same goods in two rows in addition to the fiction area reduction of goods and the smooth circulation of cooling air, and even in case the contacted bottom of goods is a concave/convex surface as shown in FIG. 8(D), if No.3 unit shelf (1*c*) is added and arranged, it is possible to reduce the friction area of goods and raise, while maintaining a stable sliding, the effect of goods display at low temperatures by smooth circulation of cooling air through separated spaces.

Figure 9:
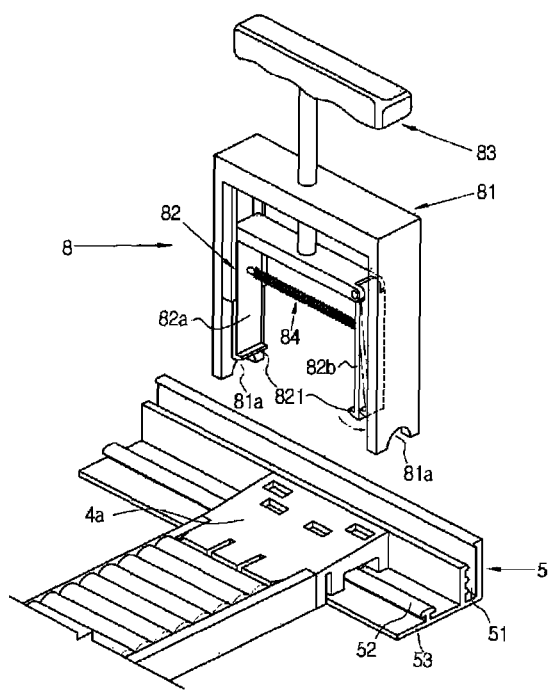
FIGS. 9 and 10 show the expanded perspective drawings for some parts of the state at which No.1 unit shelf of the goods-display shelf of the present invention is separated from the front and rear support frames by using the separation device.

Next, as another Example of the goods-display shelf of the present invention, as shown in FIG. 9, prepared is the separation device (8) to separate conveniently and safely the No.1 end cap (4*a*) of No.1, No.2, and No.3 unit shelves (1*a*, 1*b*, 1*c*) combined with the front and rear support frames (5).

The said separation device (8) is composed of the support frame (81), which is the basis for separation of No.1 end cap (4*a*) combined with the front and rear support frames (5), the tweezers (82), which pick up No.1 end cap (4*a*), the operating part (63), which is easy to grab by hands to operate the tweezers (82), and the tensile spring (84), which plays a role of closing, not opening, the said tweezers (82).

The said support frame (81) forms the "∩"-shaped groove (81*a*) at the bottom so that it may be seated on the rail (52) of the front and rear support frames (5) positioned on both sides of No.1 end cap (4*a*). Since the said groove (81*a*) contacts the horizontal part (53) at the bottom while positioned on the rail (52) of the front and rear support frames (5), the entire support frame (81) may be stably positioned and fixed to the front and rear support frames (5). The support frame (81) is formed in "▒" shape and both end parts are seated on the rail (52) of the support frames (5). The top of the rail (52) is also formed in "∩" shape. Thus, both end parts of the "▒" shape are formed in "∩" shape so that "▒"-shaped support frame (81) may be effectively seated on the rail (52). While the support frame (81) sits on the rail (52) in "∩" shape, both "∩"-shaped end parts (bottom) are in direct contact with the horizontal part (83) of the front and rear support frames (5). Thus, since the end parts (bottom) are in direct contact with the horizontal part (53) while the support frame (81) surrounds the rail (52) on both sided in "∩" shape, the entire separation device (8) may be positioned and fixed stably to the front and rear fixed frames (5).

The said tweezers (82) consist of the fixed hook support (82*a*), at whose bottom the hook chin (821) is formed so that it may pick out No.1 end cap (4*a*) at the inner side of the support frame (81) by hooking both sides, and the mobile hook support (82*b*). In addition, the said mobile hook support (82*b*) has a hinge combination at the top and the hook chin (821) at the bottom is inserted into or pulled out of both sides of No.1 end cap (4*a*).

The said operating part (83) goes through the top center of the said support frame (81) in order to move the tweezers (82) upwards and downwards, and the bottom is fixed at the top center of the said tweezers (82) and the top is made easy to grab by hands.

And the said spring (84) is a tensile coil type both ends of which are fixed at the fixed hook support (82*a*) and mobile hook support (82*b*) of the tweezers (82), and it plays a role of returning to the original position the widening mobile hook support (82*b*).

Meanwhile, the said separation device (8) has a form suitable to separating No.1 end cap (4*a*), but it is clarified that the separation device (8) to separate No.2 end cap (4*b*), which is made by putting 2 No.1 end caps (4*a*) together, can increase the width to have a structure suitable to No.2 end cap (4*b*).

Figure 10:
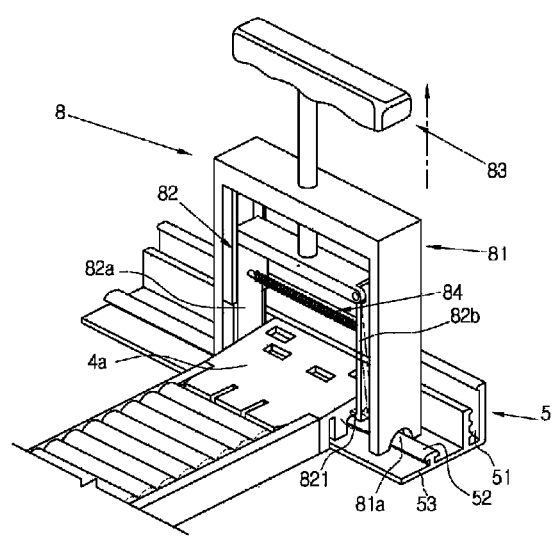

The separation device (8) made as mentioned above has the bottom which seats the support frame (81) in contact with the groove (81*a*) at the rail (52) of the front and rear support frames (5) in order to position from the state of the attached FIG. 9 to that of the attached FIG. 10. At this time, when the fixed hook support (82*a*) and mobile hook support (82*b*) of the tweezers (82) descend in contact with both sides of No. 1 end cap (4*a*), while the mobile hook support (82*b*) returns to the original state with the restoring force of the spring (840 after rotating outwards around a certain earth's axis, the hook chin (821) formed at the bottom of the fixed hook support (82*a*) and mobile hook support (82*b*) is inserted on the inner side out of both sides of No.1 end cap (4*a*). Subsequently, if the operating part (83) fixed at the top of the said tweezers (82) is raised by pulling to the top after grabbing it by hands, the hook bumps (42, 42') can be easily separated from the rail (52) of No.1 end cap (4*a*), and so the positioning and replacement are feasible.

The said process is explained regarding the separation of No.1 end cap (4*a*), but it is clarified that No.2 end cap (4*b*) also uses the separation device (8) with the same structure but different size for convenient separation to enable the positioning and replacement.

As mentioned above, the desirable Examples of the present invention are described and shown by figures, but the present invention is not limited to the same structure and actions as they are explained above. Thus, the persons in the field are aware that it is possible to change and modify the said Examples appropriately, appropriate changes, modifications, and equivalents should be considered to belong to the scope of the present invention.

[Description of Signs]

| | |
|---|---|
| 1a: No. 1 Unit Shelf | 1b: No. 2 Unit Shelf |
| 1c: No, 3 Unit Shelf | 2: Roller Unit |
| 3a: L-Type Fixed Frame | 3b: T-Type Fixed Frame |
| 3c: - Type Fixed Frame | 31: Guide Plate |
| 32: Hook Hole | 4a: No. 1 End Cap |
| 4b: No. 2 End Cap | 41: Hook Piece |
| 42, 42': Hook Bump | 421: Inclined Surface |
| 43: Inserting Groove | 5: Front & Rear Support Frames |
| 51: Inserting Groove | 52: Rail |
| 53: Horizontal Part | 54: Small Bump |
| 6: Breakaway Prevention Plate | 7: Stopper |
| 8: Separation Device | 81: Support Frame |
| 82: Tweezers | 83: Operating Part |
| 84: Spring | 821: Hook Chin |
| 81a: Groove | 82a: Fixed Hook Support |
| 82b: Mobile Hook Support | |

The invention claimed is:

1. A goods display shelf comprising: a plurality of roller units, each roller unit having a plurality of rollers and a fixed frame; the fixed frames are interconnected to expand the width of the display shelf to enable more goods to be stored on the display shelf; end caps which are inserted into a tip portion and a terminal portion of each fixed frame; and front and rear support frames into which the respective end caps are inserted, the front and rear frames each comprise an inserting groove that is adapted to receive a separation prevention plate which is used to prevent items from falling off the display shelf, wherein the fixed frames are classified into a planar-type fixed frame having a row of corresponding rollers without a guide plate, an "L"-type fixed frame having a row of corresponding rollers with a guide plate protruding integrally upward from a side thereof, and a "T"-type fixed frame having a guide plate protruding integrally upwardly from a center of thereof and a row of corresponding rollers on each side of the guide plate, wherein the guide plates used to divide the display shelf into compartments for storing items; hook holes being formed on an inner bottom of a tip portion and an inner bottom of a terminal portion of each of the "L"-, "T"-, and planar type fixed frames, wherein the end caps are classified into first end caps, which are inserted into the respective tip portions and terminal portions of the "L"- and planar-type fixed frames, and second end caps, which are inserted into the respective tip portion and terminal portion of the "T"-type fixed frame, a hook piece being formed on each of the first end caps and each of the second end caps such that the corresponding hook pieces are each inserted and hooked to the respective hook holes of the "L"-, "T"-, and planar-type fixed frames in a generally downward motion, wherein hook bumps each having an inclined surface are formed on opposing sides of a bottom portion of each of the first end caps and hook bumps are formed on opposing sides of a bottom portion of each of the second end caps, wherein the hook bumps of each first end cap face each other, and the hook bumps of each second end cap face each other wherein a "T"-shaped rail is formed on a horizontal part of each of the front and rear support frames such that the respective L"-, "T"-, and planar-type fixed frames are each mounted to the front and rear support frames by inserting the "T"-shaped rails of the front and rear support frames between the inclined surfaces of corresponding hook bumps of the respective first end caps and the respective second end caps in an interlocking manner.

2. The goods display shelf according to claim 1, further comprising:

a rubber stopper inserted into corresponding inserting grooves of the first end caps and the second end caps.

3. The goods display shelf according to claim 1, further comprising:

a separation device configured to separate the first end caps from the front and rear support frames, wherein the separation device comprises an inverted U-shaped support frame having grooves at a bottom portion thereof such that the inverted U-shaped support frame is seated on the "T"-shaped rail of each of the front and rear support frames, tweezers comprising a fixed hook support and a mobile hook support on opposed inner sides of the inverted U-shaped support frame, an operating part, which passes through a top center of the inverted U-shaped support frame and is connected to a top center of the tweezers at a bottom end in order to move the tweezers upwards or downwards, and a spring having ends that are attached to the fixed hook support and the mobile hook support of the tweezers.

* * * * *